(12) United States Patent
Onishi et al.

(10) Patent No.: US 8,569,387 B2
(45) Date of Patent: Oct. 29, 2013

(54) HYDROCARBON COMPOUND SYNTHESIS REACTION UNIT AND OPERATING METHOD THEREOF

(75) Inventors: Yasuhiro Onishi, Tokyo (JP); Yuzuru Kato, Tokyo (JP); Eiichi Yamada, Tokyo (JP); Atsushi Murata, Tokyo (JP); Osamu Wakamura, Tokyo (JP); Kentarou Morita, Tokyo (JP)

(73) Assignees: Japan Oil, Gas and Metals National, Corporation, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 274 days.

(21) Appl. No.: 12/998,216

(22) PCT Filed: Sep. 25, 2009

(86) PCT No.: PCT/JP2009/004890
§ 371 (c)(1),
(2), (4) Date: Apr. 26, 2011

(87) PCT Pub. No.: WO2010/038396
PCT Pub. Date: Apr. 8, 2010

(65) Prior Publication Data
US 2011/0190403 A1  Aug. 4, 2011

(30) Foreign Application Priority Data
Sep. 30, 2008  (JP) .................... 2008-254815

(51) Int. Cl.
*C07C 27/00* (2006.01)
*B01D 61/00* (2006.01)
*B01J 8/18* (2006.01)
*B01J 10/00* (2006.01)

(52) U.S. Cl.
USPC ............ 518/700; 210/650; 422/140; 422/187

(58) Field of Classification Search
USPC ..................... 422/140, 187; 210/650; 518/700
See application file for complete search history.

(56) References Cited

U.S. PATENT DOCUMENTS

| 5,811,469 | A | 9/1998 | Leviness et al. | |
| 2002/0035163 | A1* | 3/2002 | Vogel et al. | ................... 518/728 |

(Continued)

FOREIGN PATENT DOCUMENTS

JP  2001-524159  11/2001

(Continued)

OTHER PUBLICATIONS

European Search Report dated Jun. 18, 2012, issued in corresponding European Application No. EP 09817439.4.

(Continued)

*Primary Examiner* — Jafar Parsa
(74) *Attorney, Agent, or Firm* — Kenyon & Kenyon LLP (57) ABSTRACT

A hydrocarbon compound synthesis reaction unit which synthesizes a hydrocarbon compound by a chemical reaction of a synthesis gas including a hydrogen and a carbon monoxide as the main components, and a slurry having a solid catalyst suspended in liquid hydrocarbons, the hydrocarbon compound synthesis reaction unit is provided with: a reactor which contains the slurry inside, into which the synthesis gas is introduced, and from which the gas after the reaction is discharged from the top thereof; an internal separation device provided inside the reactor to separate the catalyst and the synthesized liquid hydrocarbons in the slurry; and an external separation device provided outside the reactor to separate the catalyst and the liquid hydrocarbons in the slurry which is extracted from the reactor.

5 Claims, 4 Drawing Sheets

(56) References Cited

U.S. PATENT DOCUMENTS

| | | |
|---|---|---|
| 2003/0018089 A1 | 1/2003 | Schweitzer et al. |
| 2004/0014825 A1* | 1/2004 | Hensman ..................... 518/702 |
| 2005/0000861 A1 | 1/2005 | Clerici et al. |
| 2007/0197667 A1 | 8/2007 | Vogel |
| 2007/0199887 A1 | 8/2007 | Boer et al. |

FOREIGN PATENT DOCUMENTS

| | | |
|---|---|---|
| JP | 2007-516065 | 6/2007 |
| JP | 2007-527794 | 10/2007 |
| WO | WO 2005/005038 | 1/2005 |
| WO | WO 2005/084791 | 9/2005 |
| WO | 2007/009955 | 1/2007 |
| WO | WO 2007/079031 | 7/2007 |

OTHER PUBLICATIONS

International Search Report dated Oct. 27, 2009 issued in corresponding PCT Application No. PCT/JP2009/004890.

* cited by examiner

HYDROCARBON COMPOUND SYNTHESIS REACTION UNIT AND OPERATING METHOD THEREOF

TECHNICAL FIELD

The present invention relates to a synthesis reaction unit of a hydrocarbon compound which synthesizes a hydrocarbon compound by blowing a synthesis gas including a hydrogen and a carbon monoxide as the main components into a slurry having a solid catalyst suspended in liquid hydrocarbons, and an operating method of the synthesis reaction unit.

This application is a national stage application of International Application No. PCT/JP2009/004890, filed Sep. 25, 2009, which claims priority to Japanese Patent Application No. 2008-254815, filed Sep. 30, 2008, the content of which is incorporated herein by reference.

BACKGROUND ART

As one method for synthesizing liquid fuels from a natural gas, a GTL (Gas To Liquids: liquid fuel synthesis) technique of reforming a natural gas to produce a synthesis gas containing a carbon monoxide gas (CO) and a hydrogen gas ($H_2$) as the main components, synthesizing hydrocarbons using this synthesis gas as a source gas by the Fischer-Tropsch synthesis reaction (hereinafter referred to as "FT synthesis reaction"), and further hydrogenating and refining the hydrocarbons to produce liquid fuel products, such as naphtha (raw gasoline), kerosene, gas oil, and wax, has recently been developed.

As a synthesis reaction unit which performs the aforementioned FT synthesis reaction, as disclosed, for example, in Patent Document 1, a bubble column type slurry bed FT reaction system in which a solid catalyst is suspended in liquid hydrocarbons to produce a slurry, and a synthesis gas is blown into a reactor containing the slurry, thereby being allowed to undergo the FT synthesis reaction, is suggested.

This type of synthesis reaction unit includes a catalyst separation device which separates the catalyst from the slurry, and performs the operation of extracting a constant amount of liquid hydrocarbons from the slurry in the reactor via the catalyst separation device.

As the aforementioned catalyst separation device, as disclosed, for example, in Patent Document 2, separation device in which a filtering device, or the like, including a filter is provided outside the reactor (external separation method), or provided inside the reactor (internal separation method) are suggested.

CITATION LIST

[Patent Document]

[Patent Document 1] Specification of US Patent Application Laid-Open Publication No. 2003-0018089

[Patent Document 2] Specification of US Patent Application Laid-Open Publication No. 2005-0000861

SUMMARY OF THE INVENTION

Problem that the Invention is to Solve

Meanwhile, in the time of maintenance of the catalyst separation device, in a case where the catalyst separation device is provided inside the reactor, it is necessary to stop the operation of the reactor and thus the productivity of the hydrocarbon compounds, which are the products, deteriorates. Further, since filtering is performed in the state where the concentration of the catalyst is high, the probability of problems resulting from the adhesion of a solid component, such as clogging of the filter, increases, and it is necessary to frequently maintain a filter element.

On the other hand, in a case where the catalyst separation device is provided outside the reactor, the slurry is extracted and introduced into a separation device. However, when the temperature falls during the transport operation or the separation treatment of the slurry outside the reactor, there is a possibility that a wax fraction in the liquid hydrocarbons may solidify. For this reason, the separation treatment of a large amount of the slurry cannot be performed, and the separation performance may be unable to be significantly improved.

As such, the external separation method and the internal separation method have problems, respectively, and have not been able to efficiently perform the separation operation of the catalyst.

The present invention was made in view of the aforementioned situation, and the object thereof is to provide a hydrocarbon compound synthesis reaction unit and its operating method which can easily and reliably perform the separation treatment of the slurry, and can significantly improve the productivity of the hydrocarbon compounds.

Means for Solving the Problem

In order to solve the above problems to achieve such an object, the present invention suggests the following means.

The hydrocarbon compound synthesis reaction unit according to the present invention is a hydrocarbon compound synthesis reaction unit which synthesizes a hydrocarbon compound by a chemical reaction of a synthesis gas including a hydrogen and a carbon monoxide as the main components, and a slurry having a solid catalyst suspended in liquid hydrocarbons, the hydrocarbon compound synthesis reaction unit is provided with: a reactor in which the slurry is contained, into which the synthesis gas is introduced, and from which the gas after the reaction is discharged from the top thereof; an internal separation device provided inside the reactor to separate the catalyst and the synthesized liquid hydrocarbons in the slurry; and an external separation device provided outside the reactor to separate the catalyst and the liquid hydrocarbons in the slurry which is extracted from the reactor.

According to the hydrocarbon compound synthesis reaction unit of this configuration, the separation devices which separate the liquid hydrocarbons and the catalyst in the slurry are provided inside the reactor (internal separation device) and outside the reactor (external separation device), respectively. Thus, by simultaneously or alternatively using two separation devices suitably depending on the needs, the operation can be stably performed, and the productivity of the hydrocarbon compounds can be improved.

For example, in the time of maintenance of the external separation device, the operation can be continued using only the internal separation device. Further, by suppressing the use frequency of the internal separation device, the maintenance interval of the internal separation device can be lengthened, and the shut down of the reactor operation can be reduced by as much as possible.

Here, a washing device which flows a washing fluid through the internal separation device and the external separation device to wash the internal separation device and the external separation device may be further provided.

As described above, as a solid component, such as a catalyst, deposits in the external separation device or the internal separation device, separation performance may deteriorate.

Here, by providing a washing device which flows a washing fluid through the internal separation device and the external separation device to wash the internal separation device and the external separation device, the solid component adhered and deposited to the internal separation device and the external separation device can be eliminated by the washing fluid, and deterioration of the separation performance of the external separation device or the internal separation device can be suppressed. Further, the frequency, i.e., execution interval of large-scale maintenance work, which needs to stop the operation, can be extended in length.

Further, the washing device may have a storage tank which stores the washing fluid, and supply the washing fluid to the internal separation device and the external separation device via the storage tank.

As described above, in the internal separation device, separation treatment is performed in a state where the concentration of the catalyst in the slurry is high. As a result, since blocking caused by a solid component, such as a catalyst, is apt to occur, it is necessary to make the frequency of washing high. On the other hand, in the external separation device, separation treatment can be performed in the state where the concentration of the catalyst is low by performing pretreatment, such as sedimentation separation, blocking caused by a solid component, such as a catalyst, hardly occurs, and it is not necessary to make the frequency of washing so high. That is, the internal separation device will differ in the frequency of washing from the external separation device. Here, by adopting a configuration in which washing is performed by supplying the washing fluid to the internal separation device and the external separation device via the storage tank, it is not necessary to simultaneously perform washing of the internal separation device and the external separation device, and it is possible to perform washing at intervals suitable for each separation device. Further, by providing the storage tank, a required amount of washing fluid can be flowed through the internal separation device and the external separation device when necessary, and the amount of the washing fluid to be used can be reduced. Particularly when some liquid hydrocarbons which are a product are used as the washing fluid, deterioration of production capability of the liquid hydrocarbons can be suppressed.

Further, the washing fluid may be the liquid hydrocarbons separated by the internal separation device or the external separation device.

As described above, compared with the case where a separate washing fluid is newly used, the cost is reduced and management of the washing fluid becomes unnecessary by using the liquid hydrocarbons separated by the internal separation device or the external separation device as the washing fluid. In addition, since the liquid hydrocarbons are separated by the internal separation device or the external separation device and are identical with what to be flowed through the separation device, they do not affect the separation device after washing, and the separation device can be used as it is after washing.

The operating method of a hydrocarbon compound synthesis reaction unit according to the present invention is an operating method of the hydrocarbon compound synthesis reaction unit as described above. This operating method includes switching operation so that the internal separation device and the external separation device are simultaneously or alternatively used.

In this case, since the internal separation device and the external separation device are switched and operated, and the internal separation device and the external separation device are simultaneously or alternatively used suitably depending on the needs, operation can be stably performed, and the productivity of the hydrocarbon compounds can be improved. In addition, when the operation of the internal separation device and the external separation device is switched to any one of the devices, it is preferable to control the opening and closing operation of valves, or the like, so that the separation device may be operated well, respectively.

Advantage of the Invention

According to the present invention, it is possible to provide the hydrocarbon compound synthesis reaction unit and its operating method which can easily and reliably perform the separation treatment of the slurry, and can significantly improve the productivity of the hydrocarbon compounds.

DESCRIPTION OF EMBODIMENTS

Hereinafter, preferred embodiments of the present invention will be described with reference to the accompanying drawings. First, with reference to FIG. 1, the overall configuration and process of a liquid-fuel synthesizing system (hydrocarbon synthesis reaction system) including a hydrocarbon compound synthesis reaction unit according to an embodiment of the present invention will be described.

Figure 1:
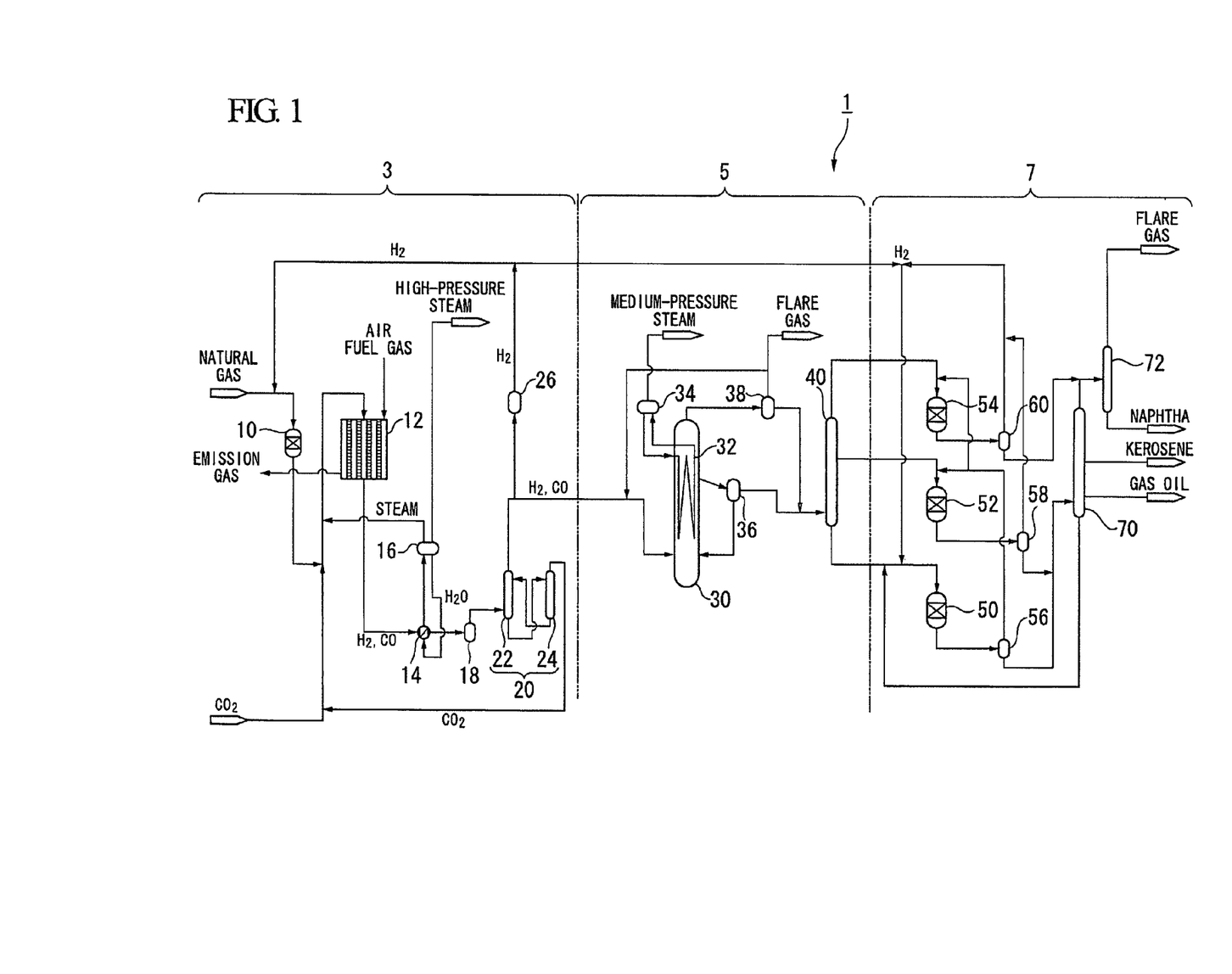
FIG. 1 is a schematic diagram showing the overall configuration of a liquid-fuel synthesizing system including a synthesis reaction unit according to an embodiment of the present invention.

As shown in FIG. 1, the liquid-fuel synthesizing system (hydrocarbon synthesis reaction system) 1 is a plant facility which carries out the GTL process which converts a hydrocarbon feedstock, such as a natural gas, into liquid fuels. This liquid-fuel synthesizing system 1 includes a synthesis gas production unit 3, a synthesis reaction unit 5, and an upgrading unit 7. The synthesis gas production unit 3 reforms a natural gas, which is a hydrocarbon feedstock, to produce a synthesis gas including a carbon monoxide gas and a hydrogen gas. The synthesis reaction unit 5 produces liquid hydrocarbons from the produced synthesis gas by the FT synthesis reaction. The upgrading unit 7 hydrogenates and refines the liquid hydrocarbons produced by the FT synthesis reaction to produce liquid fuel products (naphtha, kerosene, gas oil, wax, etc.). Hereinafter, components of each of these units will be described.

The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26. The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced in the reformer 12, to produce a high-pressure steam. The vapor-liquid separator 16 separates the water heated by heat exchange with the synthesis gas in the waste heat boiler 14 into a vapor (high-pressure steam) and a liquid. The vapor-liquid separator 18 removes a condensate from the synthesis gas cooled down in the waste heat boiler 14, and supplies a gas to the $CO_2$ removal unit 20. The $CO_2$ removal unit 20 has an absorption tower 22 which removes carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (POX) using oxygen, an autothermal reforming method (ATR) that is a combination of the partial oxidation method and the steam reforming method, a carbon-dioxide-gas reforming method, and the like can also be utilized.

$$CH_4+H_2O \rightarrow CO+3H_2 \qquad (1)$$

$$CH_4+CO_2 \rightarrow 2CO+2H_2 \qquad (2)$$

Further, the hydrogen separator 26 is provided on a branch line branched from a main pipe which connects the $CO_2$ removal unit 20 or vapor-liquid separator 18 with the bubble column reactor 30. This hydrogen separator 26 may be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption towers (not shown) which are arranged in parallel. By sequentially repeating processes including pressurizing, adsorption, desorption (pressure reduction), and purging of hydrogen in each of the adsorption towers, a high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, it may be a hydrogen storing alloy adsorption method, a membrane separation method, or a combination thereof.

Next, the synthesis reaction unit 5 will be described. The synthesis reaction unit 5 mainly includes, for example, the bubble column reactor (bubble column type hydrocarbon synthesis reactor) 30, a vapor-liquid separator 34, a catalyst separator 36 (an external catalyst separator 36A and an internal catalyst separator 36B), a vapor-liquid separator 38, and a first fractionator 40.

The bubble column reactor 30, which is an example of a reactor which synthesizes liquid hydrocarbons from a synthesis gas, functions as an FT synthesis reactor which synthesizes liquid hydrocarbons from a synthesis gas by the FT synthesis reaction. The bubble column reactor 30 includes, for example, a bubble column reactor slurry bed type reactor in which slurry having solid catalyst particles suspended in liquid hydrocarbons (product of the FT synthesis reaction) is contained. The bubble column reactor 30 makes the synthesis gas produced in the above synthesis gas production unit, i.e., a carbon monoxide gas and a hydrogen gas, react with each other to synthesize liquid hydrocarbons. In detail, in this bubble column reactor 30, the synthesis gas that is source gas is supplied as bubbles from a spager at the bottom of the bubble column reactor 30, and passes through the slurry, and in a suspended state, the hydrogen gas and the carbon monoxide gas undergo a synthesis reaction, as shown in the following chemical reaction formula (3).

$$2nH_2+nCO \rightarrow -(CH_2-)_n+nH_2O \qquad (3)$$

Since this FT synthesis reaction is an exothermic reaction, the bubble column reactor 30, which is a heat exchanger type reactor within which a heat transfer pipe 32 is disposed, is adapted such that, for example, water (BFW: Boiler Feed Water) is supplied as a coolant so that the reaction heat of the above FT synthesis reaction can be recovered as a medium-pressure steam by heat exchange between the slurry and the water.

The vapor-liquid separator 34 separates the water flowed and heated through the heat transfer pipe 32 disposed in the bubble column reactor 30 into a steam (medium-pressure steam) and a liquid. The catalyst separator 36 (the external catalyst separator 36A and the internal catalyst separator 36B) separates the catalyst particles and the liquid hydrocarbons in the slurry contained inside the bubble column reactor 30. The vapor-liquid separator 38 is connected to the top of the bubble column reactor 30 to cool down an unreacted synthesis gas and gaseous hydrocarbon products. The first fractionator 40 distills the liquid hydrocarbons supplied via the catalyst separator 36 (the external catalyst separator 36A and the internal catalyst separator 36B) and the vapor-liquid separator 38 from the bubble column reactor 30, and separates and refines the liquid hydrocarbons into individual fractions according to boiling points.

Finally, the upgrading unit 7 will be described. The upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to a bottom of the first fractionator 40. The kerosene and gas oil fraction hydrotreating reactor 52 is connected to the middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70. Then the naphtha stabilizer 72 discharges butane and components lighter than butane as a flare gas (emission gas), and separates and recovers components having a carbon number of five or more as a naphtha product.

Next, a process (GTL process) of synthesizing liquid fuel from natural gas by the liquid-fuel synthesizing system 1 configured as above will be described.

A natural gas (whose main component is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as the main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing the natural gas in advance in this way, it is possible to prevent a deactivation of catalysts used in the reformer 12, the bubble column reactor 30, etc. by, sulfur components.

The natural gas (may contain carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed therewith. The reformer 12 reforms the natural gas by using a carbon dioxide and a steam to produce a high-temperature synthesis gas including a carbon monoxide gas and a hydrogen gas as the main components, by the above steam and carbon-dioxide-gas reforming method. At this time, the reformer 12 is supplied with, for example, a fuel gas for a burner disposed in the reformer 12 and air, and reaction heat required for the above steam and $CO_2$ reforming reaction, which is an endothermic reaction is provided by the heat of combustion of the fuel gas in the burner and the radiant heat in the furnace of the reformer 12.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as high-pressure steam (for example, 3.4 to 10.0 MPaG), and a water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after the condensate is separated and removed from the synthesis gas in the vapor-liquid separator 18. The absorption tower 22 allows the carbon dioxide gas included in the synthesis gas to be absorbed into the retained absorbent liquid, to separate the carbon dioxide gas from the synthesis gas. The absorbent liquid including the carbon dioxide gas within this absorption tower 22 is introduced into the regeneration tower 24, the absorbent liquid including the carbon dioxide gas is heated and subjected to a stripping treatment with, for example, a steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above synthesis reaction unit 5. At this time, the composition ratio of the synthesis gas supplied to the bubble column reactor 30 is adjusted to a composition ratio (for example, $H_2:CO=2:1$ (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30. It is noted that it may not be necessary to provide the compressor.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform the predetermined reactions utilizing hydrogen within the liquid fuel synthesizing system 1.

Next, the above synthesis reaction unit 5 synthesizes liquid hydrocarbons by the FT synthesis reaction from the synthesis gas produced by the above synthesis gas production unit 3.

Specifically, the synthesis gas produced by the above synthesis gas production unit 3 flows in from the bottom of the bubble column reactor 30, and flows up in the slurry reserved in the bubble column reactor 30. At this time, within the bubble column reactor 30, the carbon monoxide and the hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 is returned to the heat transfer pipe 32, and a gas component is supplied to an external device as a medium-pressure steam (for example, 1.0 to 2.5 MPaG).

The liquid hydrocarbons synthesized in the bubble column reactor 30 in this way are introduced into the separator 36 (the external catalyst separator 36A and the internal catalyst separator 36B) along with catalyst particles as a slurry. The catalyst separator 36 (the external catalyst separator 36A and the internal catalyst separator 36B) separates the slurry into a solid component, such as catalyst particles, and a liquid component which includes liquid hydrocarbons. A portion of the separated solid component, such as the catalyst particles, is returned to the bubble column reactor 30, and a liquid component is supplied to the first fractionator 40. From the top of the bubble column reactor 30, an unreacted synthesis gas, and a gas component of the synthesized hydrocarbons are introduced into the vapor-liquid separator 38. The vapor-liquid separator 38 cools down these gases to separate some condensed liquid hydrocarbons and to introduce them into the first fractionator 40. Meanwhile, as for the gas component separated in the vapor-liquid separator 38, the unreacted synthesis gas (mainly CO and $H_2$) is returned to the bottom of the bubble column reactor 30, and is reused for the FT synthesis reaction. Further, the emission gas (flare gas) other than the target products, including as a main component hydrocarbon gas having a small carbon number ($C_4$ or less), is introduced into an external combustion facility (not shown), is combusted therein, and is then emitted into the atmosphere.

Next, the first fractionator 40 heats the liquid hydrocarbons (whose carbon numbers are various) supplied via the separator 36 (the external catalyst separator 36A and the internal catalyst separator 36B), or via the vapor-liquid separator 38 from the bubble column reactor 30 as described above, to fractionally distill the liquid hydrocarbons by using a difference in boiling points. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are transferred to the wax fraction hydrocracking reactor 50, the liquid hydrocarbons (mainly $C_{11}$ to $C_{20}$) as the kerosene and gas oil fraction drawn from the middle part of the first fractionator 40 are transferred to the kerosene and gas oil fraction hydrotreating reactor 52, and the liquid hydrocarbons (mainly $C_5$ to $C_{10}$) as the naphtha fraction drawn from the upper part of the first fractionator 40 are transferred to the naphtha fraction hydrotreating reactor 54.

The wax fraction hydrocracking reactor 50 hydrocracks the liquid hydrocarbons as the wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving the C—C bonds of the hydrocarbons with a large carbon number, using a catalyst and heat. A product including the liquid hydrocarbons hydrocracked in this wax fraction hydrocracking reactor 50 is separated into a gas and a liquid in the vapor-liquid separator 56, the liquid hydrocarbons of which are transferred to the second fractionator 70, and the gas component (including hydrogen gas) of which is transferred to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$) as the kerosene and gas oil fractions having a substantially middle carbon number, which have been supplied from the middle part of the first fractionator 40, by using the hydrogen gas supplied via the wax fraction hydrocracking reactor 50 from the hydrogen separator 26. In this hydrotreating reaction, in order to obtain mainly branched-chain saturated hydrocarbons, the liquid hydrocarbons are isomerized, and a hydrogen are added to unsaturated bonds of the above liquid hydrocarbons to saturate the liquid hydrocarbons. As a result, a product including the hydrotreated liquid hydrocarbons is separated into a gas and a liquid in the vapor-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats the liquid hydrocarbons (approximately $C_{10}$ or less) as the naphtha fraction with a low carbon number, which have been supplied from the upper part of the first fractionator 40, by using the hydrogen gas supplied via the wax fraction hydrocracking reactor 50 from the hydrogen separator 26. As a result, a product including the hydrotreated liquid hydrocarbons is separated into a gas and a liquid in the vapor-liquid separator 60, the liquid hydrocarbons of which are transferred to the naphtha stabilizer 72, and the gas component (including hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is lower than about 150° C.) with a carbon number of $C_{10}$ or less, kerosene (whose boiling point is about 150 to 250° C.), gas oil (whose boiling point is about 250 to 350° C.), and an uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, a hydrocarbon gas with a carbon number of $C_{10}$ or less is drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and the second fractionator 70. Thereby, the naphtha stabilizer 72 separates and refines naphtha ($C_5$ to $C_{10}$) as a product. Accordingly, a high-purity naphtha is drawn from a lower part of the naphtha stabilizer 72. Meanwhile, the emission gas (flare gas) other than products, which contains as a main component hydrocarbons with a predetermined carbon number or lower ($C_4$ or less), is discharged from the top of the naphtha stabilizer 72. Further, the emission gas (flare gas) is introduced into an external combustion facility (not shown), is combusted therein, and is then discharged to the atmosphere.

The process (GTL process) of the liquid-fuel synthesizing system 1 has been described hitherto. By the GTL process concerned, natural gas is converted into liquid fuels, such as high-purity naphtha ($C_5$ to $C_{10}$), kerosene ($C_{11}$ to $C_{15}$), and gas oil ($C_{16}$ to $C_{20}$).

Figure 2:
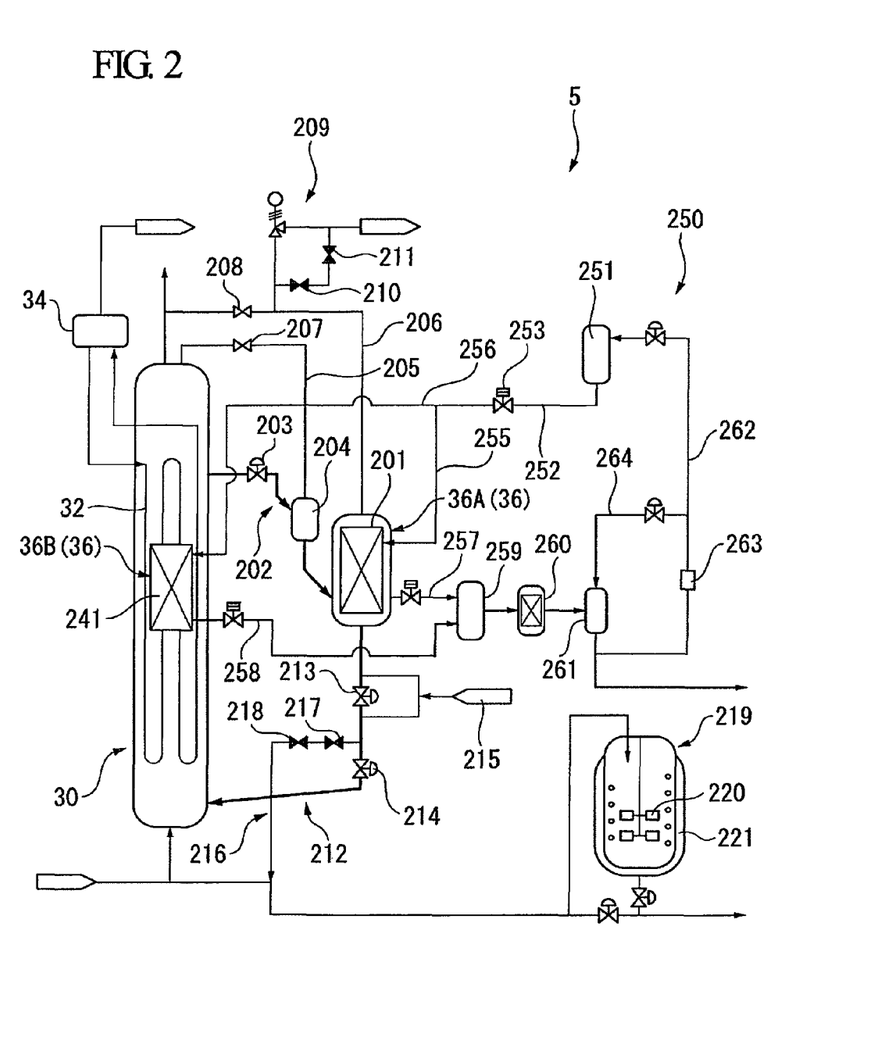
FIG. 2 is an explanatory view showing the synthesis reaction unit according to one embodiment of the present invention.

Next, the catalyst separator 36 of the hydrocarbon compound synthesis reaction unit 5 which is a feature point of the embodiment of the present invention will be described in detail with reference to FIG. 2.

The synthesis reaction unit 5 includes the external catalyst separator 36A provided outside the bubble column reactor 30, and the internal catalyst separator 36B provided inside the bubble column reactor 30 as the catalyst separator 36 which separates the catalyst particles and liquid hydrocarbons in the slurry.

In the present embodiment, the external catalyst separator 36A and the internal catalyst separator 36B includes filters 201 and 241, respectively, and a solid component, such as catalyst particles, and liquid hydrocarbons are separated by flowing the slurry through the filters 201 and 241. The separated liquid hydrocarbons are flowed to the first fractionator 40 shown in FIG. 1. Further, the separated catalyst particles are reused as the slurry.

The external catalyst separator 36A is connected to an extraction flow line 202 which extracts the internal slurry from the middle part of the bubble column reactor 30. In addition, an extraction valve 203 and a vapor-liquid separator 204 are provided in this order from the bubble column reactor 30 to the filter 201 in the extraction flow line 202. Further, the vapor-liquid separator 204 and the external catalyst separator 36A are connected to the upper part of the bubble column reactor 30 by pressure equalizing lines 205 and 206, and pressure equalizing valves 207 and 208 are disposed at the pressure equalizing lines 205 and 206. Moreover, the pressure equalizing line 206 is provided with a safety valve 209 and bypass valves 210 and 211 of the safety valve 209.

Further, a return flow line 212 which transports the catalyst (slurry) separated by the filter 201 into the bubble column reactor 30 is connected to the external catalyst separator 36A. An ON-OFF valve 213 and a return valve 214 are provided in this order from the filter 201 toward the reactor 30 in the return flow line 212. Further, a nitrogen gas introduction device 215 which alternately introduces nitrogen gas toward the upstream or the downstream of the ON-OFF valve 213 is provided.

An external circulation flow line of the slurry is formed by the extraction flow line 202, the external catalyst separator 36A, and the return flow line 212.

Further, the return flow line 212 is provided with a branch line 216 which branches from between the ON-OFF valve 213 and the return valve 214, and extraction valves 217 and 218 which extract the catalyst or the slurry from the return flow line 212 is disposed at the branch line 216.

The branch line 216 is connected to a slurry tank 219. The slurry container 219 includes an agitator 220 which agitates the slurry stored inside, and a jacket 221 which heats the slurry tank 219, and a steam is introduced into the jacket 221 so that the slurry tank 219 can be heated.

The internal catalyst separator 36B mainly separates the catalyst and the liquid hydrocarbons inside the bubble column reactor 30, the liquid hydrocarbons separated by the filter 241 are extracted to the outside of the bubble column reactor 30, and the catalyst particles separated by the filter 241 are reused inside the bubble column reactor 30.

Since the above-described external catalyst separator 36A and internal catalyst separator 36B separate a solid component, such as catalyst particles, by the filters 201 and 241, it will also be considered that separation performance deteriorates if the above solid component blocks the filters 201 and 241. For this reason, it is necessary to wash the filters 201 and 241 by periodically flowing a washing fluid through the external catalyst separator 36A and the internal catalyst separator 36B (so-called backwashing) from an opposite direction. Next, a backwashing device 250 which washes the filters 201 and 241 will be described.

The backwashing device 250 includes, for example, a storage tank 251 which stores the liquid hydrocarbons, an introducing line 252 which introduces a washing fluid toward the external catalyst separator 36A and the internal catalyst separator 36B from the storage tank 251, a flow controlling valve 253 provided in the introducing line 252, a first introducing line 255 which introduces the washing fluid into the external catalyst separator 36A from the flow controlling valve 253, and a second introducing line 256 which introduces the washing fluid into the internal catalyst separator 36B from the flow controlling valve 253. Further, the liquid hydrocarbons separated by the external catalyst separator 36A or the internal catalyst separator 36B flow via a first discharge line 257 and a second discharge line 258 to arrive at a tank 259, then further flow therefrom via a filter 260 to arrive at a separation vessel 261, and are stored therein. The stored liquid hydrocarbons are flowed through a supply line 262 by a pump 263 to be stored in the storage tank 251 as a washing fluid.

Here, the supply line 262 is provided with a flow line 264 which returns the liquid hydrocarbons to the separation vessel 261, and the flow rate to the storage tank 251 is controlled so that the amount of the liquid hydrocarbons in the storage tank 251 is kept constant. That is, only the required portion of the liquid hydrocarbons transported by the pump 263 is supplied to the storage tank 251, and the excessive liquid hydrocarbons are returned to the separation vessel 261 through the flow line 264.

The backwashing device 250 of such a configuration is operated if needed to flow a washing fluid toward the external catalyst separator 36A or the internal catalyst separator 36B from the storage tank 251 to wash down a solid component deposited and adhered to the filters 201 and 241, thereby preventing clogging of the filters 201 and 241. Accordingly, deterioration of the separation performance of the external catalyst separator 36A or the internal catalyst separator 36B is prevented.

Next, the switching control of the external catalyst separator 36A and the internal catalyst separator 36B will be described with reference to the flow charts of FIGS. 3 and 4.

First, the control of switching from the operation of the external catalyst separator 36A to the operation of the internal catalyst separator 36B will be described. In order to switch from the external catalyst separator 36A to the internal catalyst separator 36B, extraction of the slurry from the bubble column reactor 30 needs to be stopped.

First, the operation of the external catalyst separator 36A is stopped (S1). Next, the flow controlling valve 253 of the backwashing device 250 is operated to change the opening degree from that corresponding to the flow rate suitable for the external catalyst separator 36A to that corresponding to the flow rate suitable for the internal catalyst separator 36B (S2). Then, the extraction valve 203 and the return valve 214 are closed, respectively, and the external circulation of the slurry is stopped (S3). Next, the pressure equalizing valves 207 and 208 of the pressure equalizing lines 205 and 206 connected to the bubble column reactor 30 are closed (S4). The bypass valves 210 and 211 of the safety valve 209 are opened to reduce the pressure in the external circulation flow line of the slurry to about 0.2 MPaG (S5).

Next, a nitrogen gas is introduced into the upstream of the ON-OFF valve 213 from the nitrogen gas introduction device 215, and the ON-OFF valve 213 is fully opened (S6).

Further, while the steam is introduced into the jacket 221 of the slurry tank 219 to hold the slurry tank at about 150° C., the agitator 220 is operated (S7). At this time, the pressure of the slurry tank 219 is set to be substantially atmospheric pressure (50 kPaG).

Then, the extraction valves 217 and 218 provided in the branch line 216 are opened, and the slurry is transported to the slurry tank 219 by using the pressure of the nitrogen gas (S8).

The introduction of the nitrogen gas from the nitrogen gas introduction device 215 is stopped after the transport of the slurry is completed (S9). In addition, the completion of the slurry transportation is judged by an oil-level change in the slurry tank 219, a pressure drop in the external circulation flow line, etc. Further, the extraction valves 217 and 218 are closed (S10).

Next, the nitrogen gas is introduced into the downstream of the ON-OFF valve 213 from the nitrogen gas introduction device 215 (S11). The liquid hydrocarbons are introduced from the upstream of the vapor-liquid separator 204 within the extraction flow line 202 (S12). The extraction valves 217 and 218 are opened, and the liquid hydrocarbons which have passed through the vapor-liquid separator 204 and the external catalyst separator 36A are transported to the slurry tank 219 (S13). Thereafter, the extraction valves 217 and 218 are closed (S14), and the bypass valves 210 and 211 of the safety valve 209 are closed. Then, the operation of the internal catalyst separator 36B is started (S15).

After the slurry in the external circulation flow line is removed in this way, the operation is changed from the external catalyst separator 36A to the internal catalyst separator 36B.

Next, the control of switching from the operation of the internal catalyst separator 36B to the operation of the external catalyst separator 36A will be described.

First, all of the extraction valve 203 and the return valve 214 etc. are closed (S'1). Next, whether or not the liquid hydrocarbons, or the like, remain in the external circulation flow line is confirmed, and if the liquid hydrocarbons, or the like, remain, they are extracted (S'2). Next, the bypass valves 210 and 211 of the safety valve 209 are opened to adjust the inside of the external circulation flow line to the atmospheric pressure (S'3).

The liquid hydrocarbons are introduced from the upstream of the vapor-liquid separator 204 within the extraction flow line 202, and are charged into the external catalyst separator 36A by a predetermined amount (S'4). The bypass valves 210 and 211 of the safety valve 209 are closed (S'5). Next, the pressure equalizing valves 207 and 208 of the pressure equalizing lines 205 and 206 connected with the bubble column reactor 30 are opened to make the pressure in the bubble column reactor 30 and the pressure in the external circulation flow line equal to each other (S'6). The ON-OFF valve 213 is fully opened (S'7). The extraction valve 203 is opened (S'8). The return valve 214 is opened (S'9). The ON-OFF valve 213 controls a slurry flow rate (S'10). The operation of the internal catalyst separator 36B is stopped (S'11), and the operation of the external catalyst separator 36A is started.

The switching of operation from the internal catalyst separator 36B to the external catalyst separator 36A is performed.

Since the synthesis reaction unit 5 according to the present embodiment configured as described above includes the external catalyst separator 36A provided outside the bubble column reactor 30, and the internal catalyst separator 36B provided inside the bubble column reactor 30, as the catalyst separator 36 which separates the catalyst particles and liquid hydrocarbons in the slurry in the bubble column reactor 30, it is possible to simultaneously or alternatively use the external catalyst separator 36A and the internal catalyst separator 36B suitably depending the needs.

Therefore, in the time of maintenance of the external catalyst separator 36A, the operation can be continued using the internal catalyst separator 36B only. Further, by suppressing the use frequency of the internal catalyst separator 36B during normal use, deterioration of the internal catalyst separator 36B can be suppressed, maintenance interval can be lengthened, and the shut down of the operation of the bubble column reactor 30 can be reduced by as much as possible. Moreover, the separation performance of the slurry, i.e., the amount of production of the liquid hydrocarbons, can be improved by simultaneously operating both the external catalyst separator 36A and the internal catalyst separator 36B.

By simultaneously or alternatively using the external catalyst separator 36A and the internal catalyst separator 36B in this way, the operation of the bubble column reactor 30 can be stably performed, and the productivity of hydrocarbon compounds can be improved. Further, it is possible to provide a hydrocarbon compound synthesis unit which can cope with a wide range of the production capability of hydrocarbon compounds per single bubble column reactor 30.

Further, since the synthesis reaction unit includes the backwashing device 250 which removes solid components deposited and adhered to the filters 201 and 241 of the external catalyst separator 36A and the internal catalyst separator 36B, the solid component deposited and adhered to the filters 201 and 241 can be removed by flowing a washing fluid through the filters 201 and 241 of the external catalyst separator 36A and the internal catalyst separator 36B from the opposite direction, and the separation performance of the external catalyst separator 36A and the internal catalyst separator 36B can be maintained by suppressing the clogging of filters, or the like.

Moreover, since the backwashing device 250 includes the storage tank 251 which stores a washing fluid (liquid hydrocarbons), and has the first introducing line 255 and the second introducing line 256 which introduce the washing fluid into the external catalyst separator 36A and the internal catalyst separator 36B, respectively, from the storage tank 251, it is not necessary to simultaneously perform washing of the external catalyst separator 36A and the internal catalyst separator 3613, and it is possible to perform washing (backwashing) at intervals suitable for each of the separators. Further, the interval of the maintenance which needs to stop the operation can be lengthened as compared with the case where a catalyst separator is singly provided.

Further, since the backwashing device includes the flow controlling valve 253 which controls the flow rate when a washing fluid is introduced into the external catalyst separator 36A and the internal catalyst separator 36B from the storage tank 251, only the required amount of washing fluid can be flowed through the external catalyst separator 36A and the internal catalyst separator 3613, and the amount of the washing fluid to be used can be reduced. Here, in the present embodiment, it is not necessary to provide a facility which manufactures a separate washing fluid since a part of liquid hydrocarbons which are a product is used as the washing fluid. Therefore, facility costs can be reduced.

Figure 3:
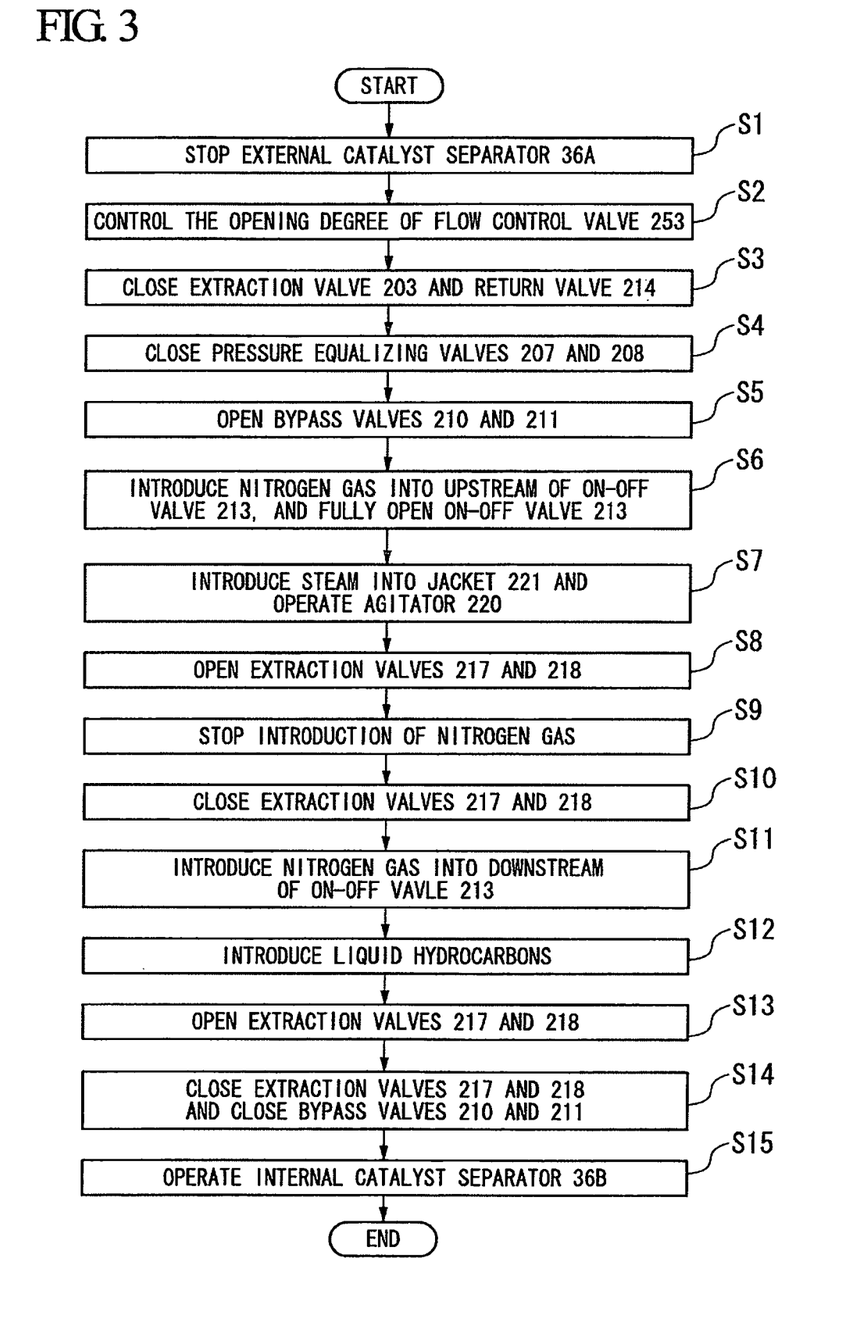
FIG. 3 is a flow chart showing the procedure of the switching of operation to an internal catalyst separator from an external catalyst separator.
Figure 4:
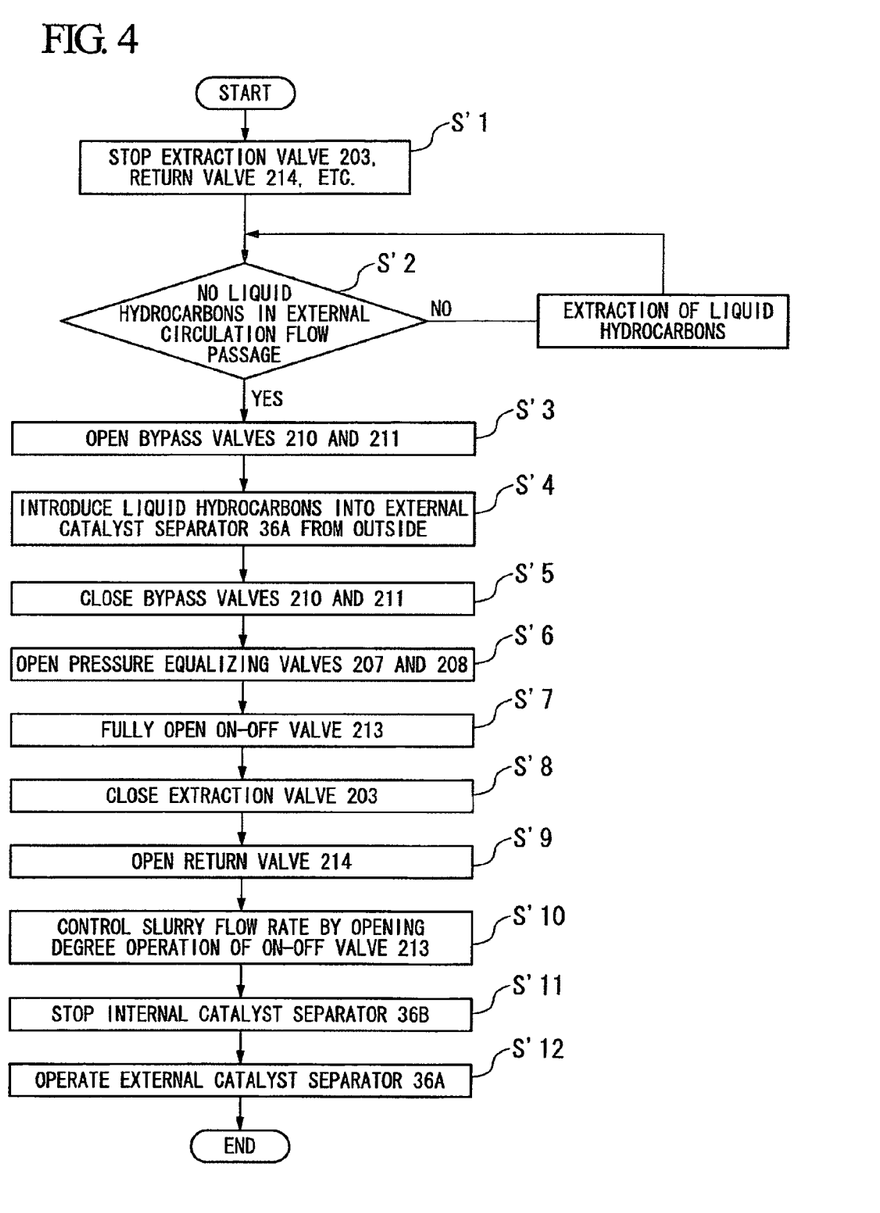
FIG. 4 is a flow chart showing the procedure of the switching of operation to the external catalyst separator from the internal catalyst separator.

Further, in the present embodiment, switching of the operation from the external catalyst separator 36A to the internal catalyst separator 36B is performed according to the procedure of the flow chart shown in FIG. 3, and switching of the operation from the internal catalyst separator 36B to the external catalyst separator 36A is performed according to the procedure of the flow chart shown in FIG. 4. Thus, any problems during the operation of the external catalyst separator 36A and the operation of the internal catalyst separator 36B can be prevented in advance, and thus, switching of the external catalyst separator 36A and the internal catalyst separator 36B can be reliably performed.

Although the embodiments of the invention have been described hitherto in detail with reference to the drawings, concrete configurations are not limited to the embodiments, and the invention also includes design changes that do not depart from the spirit of the present invention.

For example, although it has been described that the filters are respectively provided as the external catalyst separator and the internal catalyst separator, the invention is not limited thereto, and a cyclone, or the like, may be used so long as it separates a solid component and a liquid component.

Further, although it has been described that, in the backwashing device, some liquid hydrocarbons generated by the FT synthesis are used as the washing fluid, the invention is not limited thereto, and other washing fluids may be used. However, contaminations in the external catalyst separator, the internal catalyst separator, the bubble column reactor, the external circulation flow line, etc. can be prevented by using the produced liquid hydrocarbons.

INDUSTRIAL APPLICABILITY

The hydrocarbon compound synthesis reaction unit and its operating method of the present invention can easily and reliably perform separation treatment of the slurry, and can significantly improve the productivity of hydrocarbon compounds.

DESCRIPTION OF REFERENCE NUMERALS

1: LIQUID-FUEL SYNTHESIZING SYSTEM (HYDROCARBON SYNTHESIS REACTION SYSTEM)
5: SYNTHESIS REACTION UNIT
30: BUBBLE COLUMN REACTOR (REACTOR)

36A: EXTERNAL CATALYST SEPARATOR (EXTERNAL SEPARATION DEVICE)
36B: INTERNAL CATALYST SEPARATOR (INTERNAL SEPARATION DEVICE)
250: BACKWASHING DEVICE (WASHING DEVICE)
251: STORAGE CONTAINER

The invention claimed is:

1. A hydrocarbon compound synthesis reaction unit for synthesizing a hydrocarbon compound by a chemical reaction of a synthesis gas including hydrogen and carbon monoxide as main components, and a slurry having a solid catalyst suspended in liquid hydrocarbons, the hydrocarbon compound synthesis reaction unit comprising:

a reactor which is configured to contain the slurry inside, into which the synthesis gas can be introduced, and from which the gas after the reaction can be discharged from the top thereof;

an internal separation device provided inside the reactor to separate the catalyst and the liquid hydrocarbons in the slurry; and an external separation device provided outside the reactor for separating the catalyst and the liquid hydrocarbons in the slurry which is extracted from the reactor, wherein the unit is configured to switch operation so that the internal separation device and the external separation device can be simultaneously or alternatively used, wherein the unit further comprises:

a return flow line installed between the external separation device and the reactor, and configured to transfer the slurry separated by the external separation device to the reactor;

a slurry container connected to a branch line which branches from the return flow line, and to which the slurry is transferred from the external separation device; and a nitrogen gas introduction device installed on the return flow line, and configured to introduce nitrogen gas to transport the slurry to the slurry container after the external separation device is stopped and before the internal separation device is operated.

2. The hydrocarbon compound synthesis reaction unit according to claim 1, further comprising a washing device configured to flow a washing fluid through the internal separation device and the external separation device to wash the internal separation device and the external separation device.

3. The hydrocarbon compound synthesis reaction unit according to claim 2, wherein the washing device has a storage tank which stores the washing fluid, and supplies the washing fluid to the internal separation device and the external separation device via the storage tank.

4. The hydrocarbon compound synthesis reaction unit according to claim 2, wherein the washing fluid is the liquid hydrocarbons separated by the internal separation device or the external separation device.

5. An operating method of the hydrocarbon compound synthesis reaction unit according to claim 1, the operating method comprising:

switching operation so that the internal separation device and the external separation device are simultaneously or alternatively used; and introducing nitrogen gas to the return flow line to transport the slurry to the slurry container after the external separation device is stopped and before the internal separation device is operated.

* * * * *

UNITED STATES PATENT AND TRADEMARK OFFICE
CERTIFICATE OF CORRECTION

PATENT NO.       : 8,569,387 B2                                 Page 1 of 1
APPLICATION NO.  : 12/998216
DATED            : October 29, 2013
INVENTOR(S)      : Yasuhiro Onishi et al.

It is certified that error appears in the above-identified patent and that said Letters Patent is hereby corrected as shown below:

In the Specification

Column 14, line 5, change "3613" to -- 36B --;

Column 14, line 16, change "3613" to -- 36B --.

Signed and Sealed this
Fifth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,569,387 B2  Page 1 of 1
APPLICATION NO. : 12/998216
DATED : October 29, 2013
INVENTOR(S) : Onishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
Twenty-second Day of September, 2015

Michelle K. Lee
*Director of the United States Patent and Trademark Office*